Figure 1:
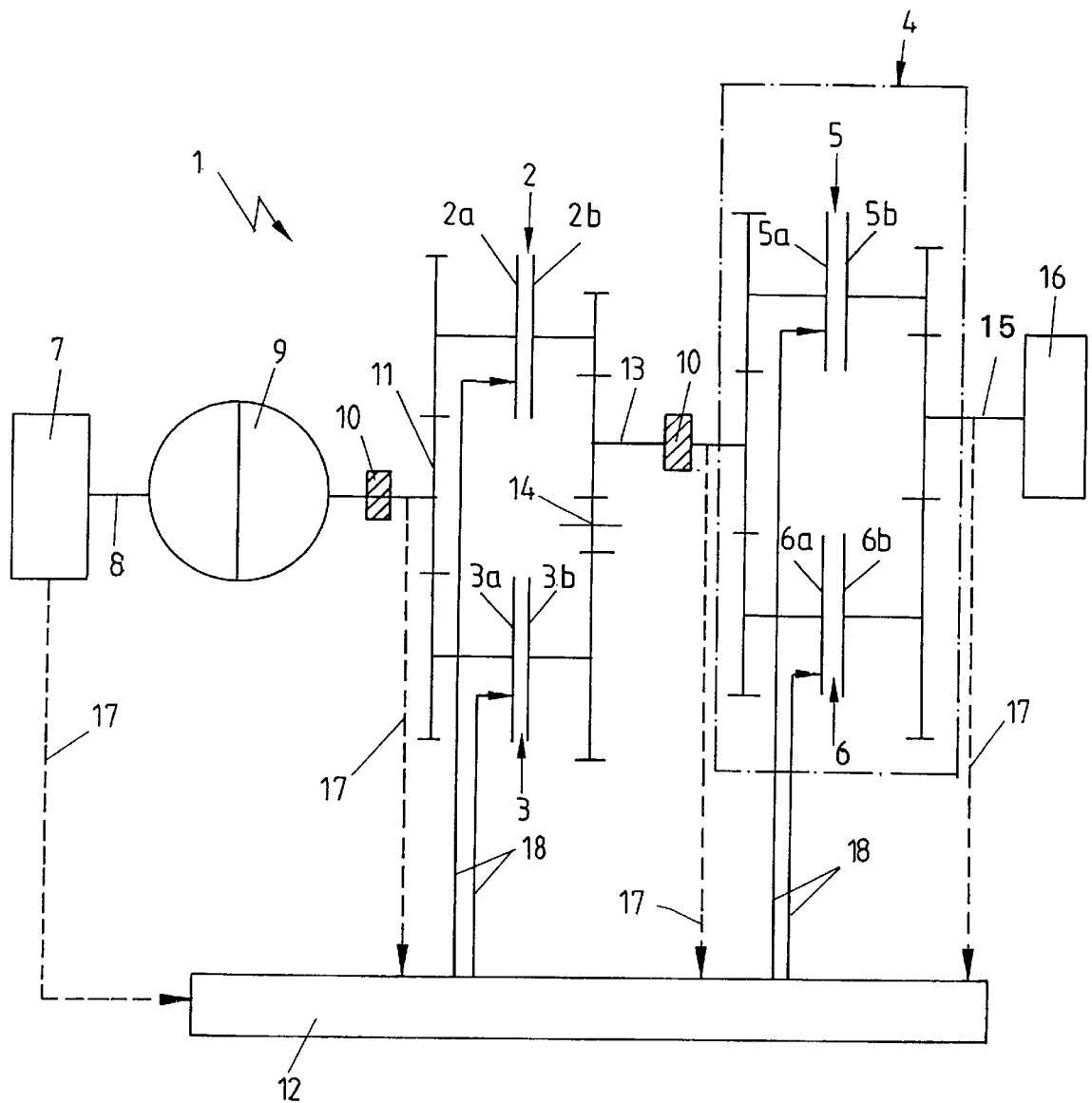

United States Patent
Heitz et al.

[11] Patent Number: 6,026,699
[45] Date of Patent: Feb. 22, 2000

[54] SHUTTLE SHIFT CONTROL USING BOTH A DIRECTIONAL CLUTCH AND A TRANSMISSION CLUTCH

[75] Inventors: Uwe Heitz, Friedrichshafen; Hugo Burkhart, Ravensburg; Ralf Dreibholz, Meckenbeuren, all of Germany

[73] Assignee: ZF Friedrichshafen AG, Friedrichshafen, Germany

[21] Appl. No.: 09/117,955

[22] PCT Filed: Mar. 21, 1997

[86] PCT No.: PCT/EP97/01429

§ 371 Date: Aug. 10, 1998

§ 102(e) Date: Aug. 10, 1998

[87] PCT Pub. No.: WO97/37157

PCT Pub. Date: Oct. 9, 1997

[30] Foreign Application Priority Data

Mar. 30, 1996 [DE] Germany ............................ 196 12 863

[51] Int. Cl.$^7$ ..................................................... F16H 61/02
[52] U.S. Cl. ........................... 74/336 R; 477/143; 477/86
[58] Field of Search ................................. 74/335, 336 R; 477/143, 166, 169, 79, 86

[56] References Cited

U.S. PATENT DOCUMENTS

| | | | |
|---|---|---|---|
| 4,090,414 | 5/1978 | White .................................... | 74/335 X |
| 5,036,718 | 8/1991 | Bulgrien .................................. | 74/335 |
| 5,101,688 | 4/1992 | Pearce et al. ....................... | 192/3.58 X |
| 5,353,662 | 10/1994 | Vaughters .............................. | 74/336 R |
| 5,367,914 | 11/1994 | Ordo ......................................... | 74/331 |
| 5,450,768 | 9/1995 | Bulgrien et al. ...................... | 74/336 R |
| 5,478,289 | 12/1995 | Matsushita et al. .................... | 475/132 |

FOREIGN PATENT DOCUMENTS

| | | |
|---|---|---|
| 309070 | 9/1987 | European Pat. Off. . |
| 0 608 751 A1 | 8/1994 | European Pat. Off. . |
| 708276 | 4/1996 | European Pat. Off. . |
| 27 16 531 | 11/1977 | Germany . |
| 36 33 372 A1 | 4/1988 | Germany . |
| 38 12 327 A1 | 6/1989 | Germany . |
| 43 19 147 A1 | 1/1994 | Germany . |
| 728501 | 4/1955 | United Kingdom . |

*Primary Examiner*—Khoi Q. Ta
*Attorney, Agent, or Firm*—Davis and Bujold

[57] ABSTRACT

A gear control for reduces the thermal stress on switching components (2, 3, 4, 5, 6) of a reversing gear (1) for machines having an input shaft (8) and an output shaft (15) and at least one directional switch for forward motion (2) and one for reverse motion (3) and a downstream load-switchable switching set (4) with several switching components (5, 6) allocated to a gear. Here the switching components (2, 3, 5, 6) can be electrically and/or hydraulically controlled by a regulating and control device (12) in such a way that, during a switching operation, in addition to one of the directional switching components (2, 3) corresponding to the switching operation, at least one other switching components (5, 6) of the downstream switching set (4) lying in the power flow and fully engaged at the start of a reversal is set to a slip state under frictional load. The frictional load is thus distributed between the directional switching components (2, 3) and the other slipping switching components (5, 6).

11 Claims, 2 Drawing Sheets

SHUTTLE SHIFT CONTROL USING BOTH A DIRECTIONAL CLUTCH AND A TRANSMISSION CLUTCH

The invention relates to a gear control for reducing the thermal stress of switching components in a reversing gear for working machines.

In the reversing gears known in the prior art (which are mainly countershaft designs, in which two or more switching components are used for switching a gear and with which a vehicle is capable in the same manner to move in forward and reverse travel directions) the switching components that slip when changing from forward motion to reverse motion, or viceversa, are exposed to high thermal stresses. Since the reversing operation is usually carried out only by a single switching component or a single reversing clutch, the single switching component alone has to absorb the complete power loss or frictional energy.

This high thermal stress requires a correspondingly sturdy design in the switching components, which disadvantageously results in the switching components needing large spaces and being heavy as well as elevated production costs.

DE 18 12 327 discloses a double-clutch transmission for a motor vehicle and a process for adjusting it. The double-clutch transmission has an input shaft and an output shaft which are interconnected by spur toothed gear pairs and are selectively engageable. A first clutch and a second clutch are provided, the first clutch halves being rigidly connected with the input shaft and the second clutch halves with a shaft or a hollow shaft that surrounds the input shaft. Switching means serve to actuate the clutches in order to lead the power flow, in one gear between input and output shafts via the clutch, the shaft, gear-change sleeves and a first set of gear pairs or, in an adjacent gear, via the second clutch, the hollow shaft, the gear-change sleeves and a second set of gear pairs. When starting the motor vehicle, the appertaining clutch and appertaining gear-change sleeve of one gear, and the other clutch and one gear-change sleeve of another gear allocated to the other clutch, are actuated simultaneously. When the output speed of the clutch of one of the gears reaches the input speed thereof, the power flow is interrupted in said gear.

This known process or this double-clutch transmission offers a possibility of reducing the thermal stress of the starting clutch or starting clutches in a double-clutch transmission, resulting from friction.

Even though said proposed process offers the advantage that in a double-clutch transmission the considerable energy generated in the friction linings when starting, which is released in the form of heat, has to be absorbed not by one switching component only, but is instead distributed between two switching components. The distribution, however, takes place uniformly and independently of the existing operating state of the clutch, whereby overheating of a clutch which, for example, already shows greater wear than the other clutch, can occur.

In addition, the process according to DE 38 12 327 disadvantageously can only be used in double-clutch transmissions, the input and output shafts of which are interconnected by spur toothed gear pairs, are selectively engageable, and serve, in particular, for reducing the frictional stress in extreme starting operations.

Accordingly, the present invention is based on the problem of developing a gear control of the above mentioned kind wherein the switching components that take part in the reversal, that is, when changing from forward motion to reverse motion or viceversa, of a countershaft design reversing gear are prevented from thermally overstressing.

The gear control, according to the invention, makes possible the advantageous distribution of thermal stress resulting from the friction between the switching components taking part in the switching operation, whereby they can last longer or be made smaller without being overheated by excessive frictional stress.

This results in the advantage that the space needed, the cost and the weight of the switching components can be substantially reduced.

With the reduction of the friction work and frictional energy in the switching components or reversing clutches, a further advantage results in that the switching time can be shortened.

The gear control, according to the invention, additionally offers the advantage of slowing down the aging of the oil, which is used in hydraulic switches, whereby changing the transmission oil is needed only after large time intervals. Costs of operation can thus be advantageously reduced.

Figure 2:
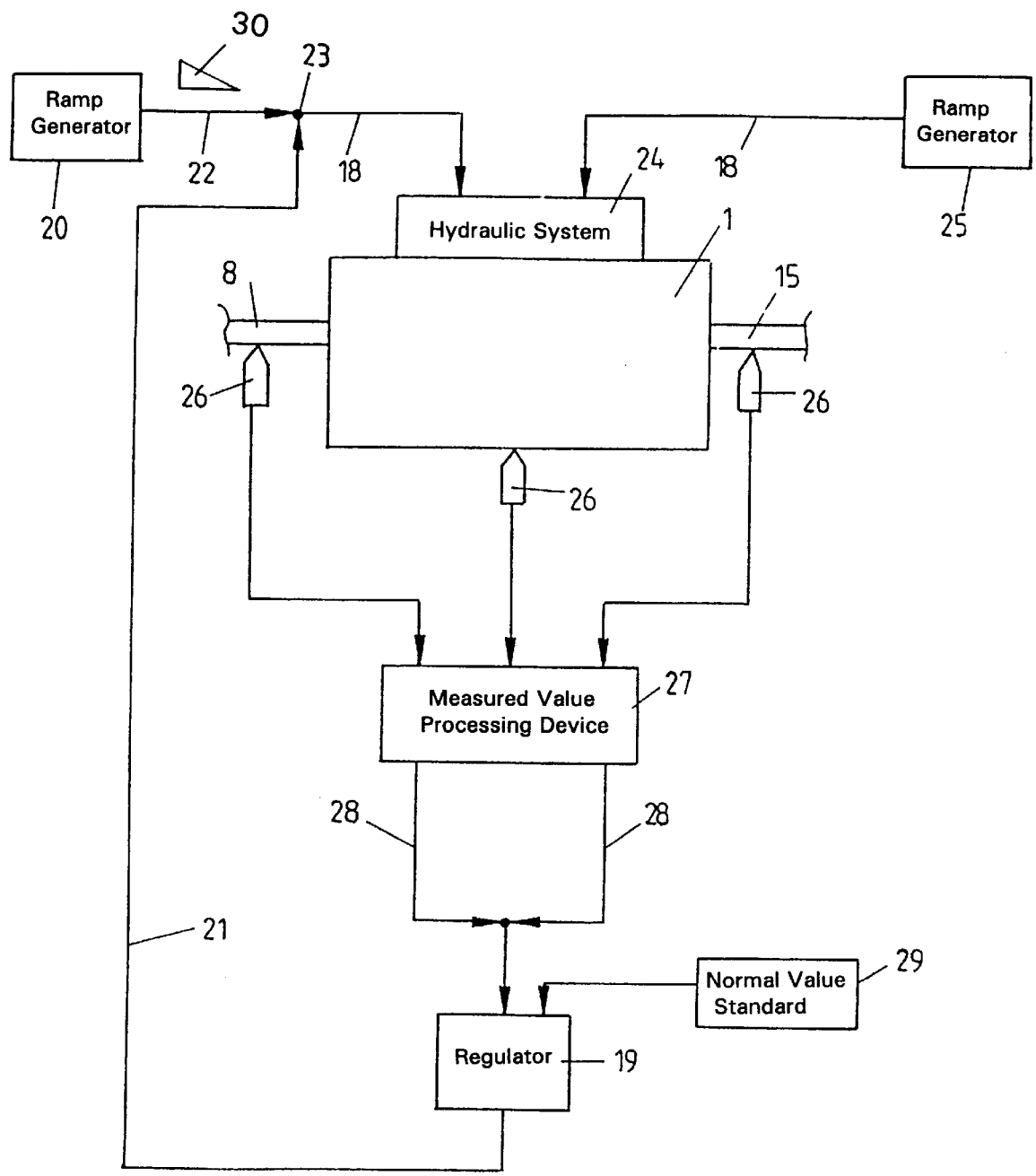

Other advantages and advantageous developments of the invention result from the sub-claims and from the embodiment described below with reference to the enclosed drawings, in which:

FIG. 1 is a very schematized, fundamental representation of a reversing gear, for explaining the gear control or mode of operation thereof, according to the invention; and FIG. 2 is a very schematized, fundamental representation of a gear control, according to the invention, for explaining the mode of operation thereof.

Referring to FIG. 1, a reversing gear 1, such as those used in working machines, for example, loaders, is shown. The reversing gear 1 has a directional switch component for forward motion 2 and a directional switch component for reverse motion 3.

FIG. 1 also shows a downstream load-switchable switching set with switching components 5 and 6, respectively, allocated to a gear.

The reversing switching components 2 and 3, the same as the switching components 5 and 6, are friction clutches each having two clutch halves 2A, 2B, 3A, 3B, 5A, 5B, 6A, 6B, respectively.

An engine 7, drives an input shaft 8 of the reversing gear 1, the input shaft 8 being connected with a converter 9, which serves for starting and builds up an elevated torque, which has to be absorbed by the switching components 2, 3, 5, 6. The power flow is transmitted from the input shaft 8 to respective first clutch halves 2A, 3A of the directional switching components 2, 3, via the converter 9, an intercalated mass 10 and a gear 11. The directional switching components 2, 3 designed as friction clutches or reversing clutches can be switched under load, whereby it is possible in such reversing gears to change while driving from forward motion to reverse motion or viceversa.

If the driver, for example, reversed a selector switch (not shown), thus switching from forward to reverse motion or viceversa, the switching components 2, 3, 5, 6 loadable with pressure are controlled by a regulating and control unit 12 in a manner such that pressure is disconnected from certain clutches, and other clutches are loaded with pressure.

During said switching operation the converter 9 is likewise engaged, which, depending on converter input and output speeds, produces a converter input and output torque and thus, in addition, absorbs part of the reversing energy or frictional energy during the reversing operation.

In order to prevent the whole frictional stress from lying on one of the reversing clutches 2 or 3, and to reduce the thermal stress on the switching components 2, 3, 5, 6, the switching components are electrically and hydraulically controlled by the regulating and control unit 12 in a manner such that in addition to a reversal of one of the reversing switching components 2, 3 (whichever corresponds to the switching operation) from forward motion to reverse motion or viceversa, another of the switching components 5 or 6 of the downstream switching set 4 lying in the power flow is set to a slip state. To this end, the pressure in one of the participating switching components 5 or 6, which already was fully engaged or switched at the beginning of the reversing operation, is entirely released from pressure to be then again loaded with pressure. Thus, said additional switching component 5 or 6 can also assume frictional work. The pressure curve during the loading of said switching component 5 or 6 with pressure rises in the form of a ramp.

According to the selected direction of travel, the power flow is transmitted via one of the clutch halves 2B and 3B from one of the clutch halves 2A or 3A of the directional switching component 2 or 3 to an intermediate shaft 13 on which a mass 10 is also situated, and from there to the downstream switching set 4. At the same time, between the second clutch half 3B of the directional switching component 3 and the intermediate shaft 13, an intermediate gear 14 based on the reversal in direction of rotation is situated.

The power flow is transmitted from the intermediate shaft 13 to the first clutch half 5A or 6A of the switching component 5 or 6 and from there, alternatively depending on the switching position, via the second clutch half 5B or the second clutch half 6B to an output shaft 15 which leads to an output 16, shown very schematized.

Instead of the switching set 4 with the switching components 5 and 6, a switching set with a larger number of downstream switching components is obviously possible as an alternative.

To explain the gear control, a shifting cycle of a reversing switch from forward to reverse motion is described herebelow, that is, the change over from the directional switching component 2 to the directional switching component 3, which is effected while driving. Here it is assumed that at the beginning of the reversing operation, that is, in the state of forward motion, the switching component 6 is fully engaged. During the reversal, the switching component 5 is open the same as in the reversals known from the prior art, and in addition, completely departing from the known reversals, the switching component 6, which was fully engaged at the beginning of the reversing operation, is set to a slip state for reverse motion in addition to the directional component 3. Thus, the friction, which is generated during the switching operation, is distributed between the reversing switching component 3 and the switching component 6 so that thermal stress on the directional switching component 3 is prevented.

In principle, one of the downstream switching components 5, 6 the number of which can be higher in other embodiments, which was closed at the beginning of the reversal, is always set to the slip state.

The differential speeds $\Delta n2$, $\Delta n3$, $\Delta n5$, $\Delta n6$ of the switching components 2, 3, 5, 6, respectively, are detected at any moment by measurement or calculation. For this purpose, a sensor system, not shown in detail, is provided in the reversing gear 1. The sensor system detects operating states such as speed and temperature, among others, on the shafts 8, 13 and 15, on the switching components 2, 3, 5 and 6, on the engine 7, and on the output 16, and passes these onto the regulating and control unit 12. This data transfer is shown in FIG. 1 by a few exemplifying arrows 17, which symbolize data lines.

The differential speeds between the activated directional switch component and the additionally engaged switching component 5 or 6 are regulated by an electronic system, shown in the regulating and control unit 12.

The switching components 2, 3, 5 and 6 can be controlled or actuated with pressures of different strengths, the control of the participating parts, system portion (not shown in FIG. 1) of the regulating and control unit 12, both of which are shown in further detail in FIG. 2. by exemplifying arrows 18.

The mode of operation of the gear control of the reversing gear 1 is explained in detail with reference to FIG. 2 which details a portion of the regulating and control unit 12 and the electronic system, in conjunction with the reversing gear 1 and the shafts 8, 15. As above, the shifting cycle from forward motion to reverse motion with the slipping switching components 3 and 6 is again examined here.

The pressure on one of the directional switching components 2, 3 of FIG. 1 is adjusted during the switching operation by a hydraulic system 24 controlled by a control signal having as components a control portion and a regulating portion.

As is to be understood from FIG. 2, the regulating portion is set by a regulator 19 and the control portion is a diagrammatically shown ramp generator 20, wherein a basically shown line 21 coming from the regulator 19 and a hydraulic system 24 controlled by a combined control signal having as a components a control line 22 coming from the ramp generator 20 meet at an intersection point 23. From there, the regulating and control portions transmit via a command line 18 to the diagrammatically shown hydraulic system 24 which loads with pressure the directional switching components 2, 3. The switching components 5, 6 of the downstream switching set 4 are controlled by a ramp generator 25 diagrammatically shown in FIG. 2, which presets a ramp-like pressure curve.

In the concretely described switching operation, the pressure is thus adjusted, via the command pipe 18, on the directional switching component 3, while the pressure on the additionally slipping switching component 6 is adjusted via another command line 18. The pressure on the switching component 6 facing the output shaft 15 is thus a purely controlled pressure preset by a time-dependent pressure ramp.

The speeds of the input shaft 8, of the output shaft 15, and of the switching components 2, 3, 5, 6 are each measured by speed sensors or tachometers 26. But the tachometers 26 shown in FIG. 2 do not correspond to the actual number of speed sensors, and stand only symbolically for a large number of speed sensors. The speeds detected by the speed sensors 26 are passed on to a measured value processing device 27, which detects the differential speeds $\Delta n3$, $\Delta n6$ of the slipping switching components, in this case of the directional switching component 3 and the switching component 6. Both differential speeds must be equal during the whole reversing phase. The detected differential speeds $\Delta n6$ and $\Delta n3$ enter via lines 28 into the regulator 19 where they are compared with a nominal value for the difference between the differential speeds, which is adjusted to zero. The nominal value standard is symbolically shown as 29 in FIG. 2. The nominal value zero corresponds here to a uniform distribution of the frictional stress between the participating components 3 and 6. From the eventually appearing difference of the differential speeds $\Delta n6$ and $\Delta n3$ of the two slipping switching components 6 and 3, the regulator 19 detects the regulating variable which is passed on to the directional switching component 3. If the difference between the differential speeds $\Delta n6$ and $\Delta n3$ equals zero, the regulator 19 is not activated, but if the difference, on the other hand, does not equal zero a corresponding regulating variable is issued by the regulator 19 to the reversing switching component 6.

In the reversing operation described it has been assumed that both slipping switching components 3 and 6 are stressed with equal frictional load, as they normally are. But if a different frictional stress of the participating switching components 3 and 6 is desired, for example, as a consequence of different wear symptoms on the switching components, the stress can be unequally distributed by a nominal value different from zero between the switching components 3, 6. The frictional stress can thus be adapted individually to the thermal load capacity of the switching components.

| Reference numerals | |
|---|---|
| 1 | reversing gear |
| 2 | directional switching component |
| 2A | clutch half |
| 2B | clutch half |
| 3 | directional switching component |
| 3A | clutch half |
| 3B | clutch half |
| 4 | downstream switching set |
| 5 | switching component |
| 5A | clutch half |
| 5B | clutch half |
| 6 | switching component |
| 6A | clutch half |
| 6B | clutch half |
| 7 | engine |
| 8 | input shaft |
| 9 | converter |
| 10 | mass |
| 11 | gear |
| 12 | regulating and control unit |
| 13 | intermediate shaft |
| 14 | intermediate gear |
| 15 | output shaft |
| 16 | output |
| 17 | data line |
| 18 | command line |
| 19 | regulator |
| 20 | ramp generator |
| 21 | line |
| 22 | line |
| 23 | intersection point |
| 24 | hydraulic system |
| 25 | ramp generator |
| 26 | speed sensor |
| 27 | measured value processing device |
| 28 | line |
| 29 | nominal value standard |
| 30 | ramp shaped function |

We claim:

1. A process for controlling a reversing gear having:
one input shaft;
one output shaft;
at least one directional switching component for forward motion;
at least one directional switching components for reverse motion; and
a downstream load-switchable switching set with a downstream switching components allocated to one gear;
the process comprising the step of:
controlling the switching components via a regulating and control unit such that during a switching operation, in which one of the directional switching components takes part in the switching operation, at least one downstream switching component of the downstream switching set lying in the power flow and fully engaged at the beginning of a reversing operation is switched to a slip state under frictional load and simultaneously slips with the directional switching component, whereby any resulting frictional stress is distributed between the directional switching component taking part in the switching operation and the slipping downstream switching component, the thermal stress of said switching components of said reversing gear thus being reduced.

2. The process for controlling a reversing gear of claim 1, wherein the directional switching components and the downstream switching components can be loaded with pressure for switching, and wherein the step of controlling the switching components is carried out by pressure loading.

3. The process for controlling a reversing gear of claim 1, wherein the step of controlling the directional switching components is in part carried out by adjusting the pressure on the directional switching components according to a combined signal provided by a regulating and control unit, the signal having a control portion and a regulating portion.

4. The process for controlling a reversing gear of claim 3, wherein the regulating portion of the signal is determined by the difference between the differential speeds $\Delta n$ of the directional switching component taking part in the switching operation and of the downstream switching component additionally set to a slip state under frictional load.

5. The process for controlling a reversing gear of claim 4, wherein the difference between the differential speeds is compared to a nominal value, the regulating portion of the signal being zero if the difference between the differential speeds equals the nominal value.

6. The process for controlling a reversing gear of claim 5, wherein the nominal value is zero for normal operation and even distribution of frictional forces between the directional switching component taking part in the switching operation and the downstream switching component additionally set to a slip state under frictional load.

7. The process for controlling a reversing gear of claim 5, wherein the nominal value is non-zero for uneven distribution of frictional forces between the directional switching component taking part in the switching operation and the downstream switching component additionally set to a slip state under frictional load, whereby thermal stress can be reduced in switching components having differing degrees of wear.

8. The process for controlling a reversing gear of claim 2, wherein the downstream switching component additionally set to a slip state under frictional load is pressure controlled according to a presettable, time-dependent, ramp-shaped pressure curve.

9. A method for controlling a reversing gear having:
an input shaft;
an output shaft;
at least one first directional switching component for forward motion;
at least one second directional switching component for reverse motion;
a downstream load-switchable switching set with a downstream switching components allocated to one gear;
a sensor system; and
a regulating and control unit having at least a hydraulic system, a measured value processing device, and a regulator;

the method comprising the steps of:
- switching, via pressure provided by the hydraulic system, one of the first directional switching component and the second directional switching component, whichever corresponds to the switching operation, to a slip state under frictional load, the pressure provided by the hydraulic system being controlled according to a combined control signal having a control, ramp-shaped function portion and a regulating portion;
- switching, via pressure provided by the hydraulic system, at least one of the downstream switching components of the downstream load-switchable switching set, which is fully engaged at the beginning of a reversing operation, to a slip state under frictional load, the pressure provided by the hydraulic system being controlled according to a control, ramp-shaped function signal;
- measuring, with the sensor system, the speed of at least one of the input shaft, the output shaft and the switching components;
- determining, in the measured value processing device, a differential speed $\Delta n$ of each of the slipping switching components;
- determining, in the regulator, the difference between the differential speeds, and comparing the difference to a nominal value standard; and
- generating the regulating portion of the combined control signal if the difference between the differential speeds does not equal the nominal value standard, the regulating portion of the combined control signal serving to adjust the slipping directional switching component such that the difference between the differential speeds equals the nominal value standard.

10. The method for controlling a reversing gear of claim 9 further comprising the step of setting the nominal value to zero if frictional stress is to be uniformly distributed between the slipping switching components.

11. The method for controlling a reversing gear of claim 9 further comprising the step of setting the nominal value to a value other than zero if frictional stress is to be non-uniformly distributed between the slipping switching components, the non-zero value of the nominal value being determined according to differences in the amount of wear associated with each switching component.

* * * * *